United States Patent
Nakamura

(10) Patent No.: US 10,126,994 B2
(45) Date of Patent: Nov. 13, 2018

(54) PRINTING SERVICE PROVIDING APPARATUS, PRINTING SERVICE SYSTEM, AND NON-TRANSITORY COMPUTER READABLE STORAGE MEDIUM ENABLING SELECTION OF AN APPLICATION FUNCTION USING CLOUD COMPUTING

(71) Applicant: FUJI XEROX CO., LTD., Tokyo (JP)

(72) Inventor: Satoru Nakamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/488,026

(22) Filed: Apr. 14, 2017

(65) Prior Publication Data
US 2018/0121145 A1    May 3, 2018

(30) Foreign Application Priority Data

Nov. 2, 2016   (JP) .................................. 2016-215251

(51) Int. Cl.
G06F 15/00   (2006.01)
G06F 3/12    (2006.01)
G06K 1/00    (2006.01)
H04N 1/00    (2006.01)

(52) U.S. Cl.
CPC .......... *G06F 3/1256* (2013.01); *G06F 3/1205* (2013.01); *G06F 3/1288* (2013.01); *H04N 1/00413* (2013.01); *H04N 1/00474* (2013.01); *H04N 2201/0094* (2013.01)

(58) Field of Classification Search
CPC .... G06F 3/1256; G06F 3/1205; G06F 3/1288; H04N 1/00413; H04N 1/00474; H04N 2201/0094

USPC ............................... 358/1.15, 1.13, 1.14, 1.1
See application file for complete search history.

(56) References Cited

U.S. PATENT DOCUMENTS

2010/0265541 A1   10/2010  Torii
2015/0268911 A1*   9/2015  Sato ...................... G06F 3/1292
                                                    358/1.14
2017/0149985 A1*   5/2017  Nomura ................ G06F 3/1204

FOREIGN PATENT DOCUMENTS

JP   2009-141686 A   6/2009
JP   2010-250532 A   11/2010
JP   2014-052751 A   3/2014

* cited by examiner

*Primary Examiner* — Douglas Tran
(74) *Attorney, Agent, or Firm* — Oliff PLC

(57) ABSTRACT

A printing service providing apparatus includes a display controller that performs control to display a setting screen on a printing device that a user uses for printing. The setting screen enables the user to select (i) a basic function that is commonly provided to printing devices compatible with a printing service that uses cloud computing and (ii) an application function which is other than the basic function and which is provided by the printing device that the user uses for printing among the printing devices compatible with the printing service which uses the cloud computing. The apparatus also includes a transmitting unit that transmits a print target file to the printing device that the user uses for printing, when a print attribute indicating contents of a print instruction is set from the setting screen.

10 Claims, 5 Drawing Sheets

FIG.5

| PRINT SETTINGS SCREEN (1 / 2) | USER : userA | LOG OUT |

COLOR MODE: AUTOMATIC
COLLECTIVELY ONE SHEET (N UP): SORTED (PER COPY)
COPY: 2

DUPLEX/SINGLE-SIDE SELECTION: SINGLE SIDE
SORT: SORTED (PER COPY)
OFFSET DISCHARGE: NOT

PAPER TRAY: AUTOMATIC
DISCHARGE DESTINATION: AUTOMATIC

MESSAGE:

[ MENU ]    [ NEXT PAGE ]    [ PRINT ]

FIG.6

| PRINT SETTINGS SCREEN (2 / 2) | USER : userA | LOG OUT |

BOOKBINDING: NOT
START PAGE: 1

STAPLE: NOT
END PAGE: 1

PUNCH: DO

MESSAGE:

[ MENU ]    [ PREVIOUS PAGE ]    [ PRINT ]

PRINTING SERVICE PROVIDING APPARATUS, PRINTING SERVICE SYSTEM, AND NON-TRANSITORY COMPUTER READABLE STORAGE MEDIUM ENABLING SELECTION OF AN APPLICATION FUNCTION USING CLOUD COMPUTING

CROSS-REFERENCE TO RELATED APPLICATIONS

This application is based on and claims priority under 35 USC 119 from Japanese Patent Application No. 2016-215251 filed Nov. 2, 2016.

BACKGROUND

(i) Technical Field

The present invention relates to a printing service providing apparatus, a printing service system, and a non-transitory computer readable storage medium.

(ii) Related Art

In recent years, printing services using a cloud computing (hereinafter simply referred to as a "cloud") have been provided. A user who wishes to use a printing service based on a cloud may print with a desired printer after uploading a print target file to the cloud in advance.

Printers have different functions that may be used depending on makers and models. However, a printing service creates a common screen, which can use a basic function common to plural printers compatible with the printing service and which is independently of manufacturing companies, and provides the created common screen to a user, thereby achieving convenience for user operability.

SUMMARY

According an aspect of the invention, a printing service providing apparatus includes
a display controller that performs control to display a setting screen on a printing device that a user uses for printing, the setting screen enabling the user to select (i) a basic function that is commonly provided to printing devices compatible with a printing service that uses cloud computing and (ii) an application function which is other than the basic function and which is provided by the printing device that the user uses for printing among the printing devices compatible with the printing service which uses the cloud computing, and
a transmitting unit that transmits a print target file to the printing device that the user uses for printing, when a print attribute indicating contents of a print instruction is set from the setting screen.

BRIEF DESCRIPTION OF THE DRAWINGS

Exemplary embodiments of the present invention will be described in detail based on the following figures, wherein:

FIG. 5 is a view illustrating an example of a setting screen displayed by a setting screen application according to the exemplary embodiment;

FIG. 6 is a view illustrating another example of the setting screen displayed by the setting screen application according to the exemplary embodiment.

DETAILED DESCRIPTION

Hereinafter, an exemplary embodiment of the present invention will be described with reference to the accompanying drawings.

Figure 1:
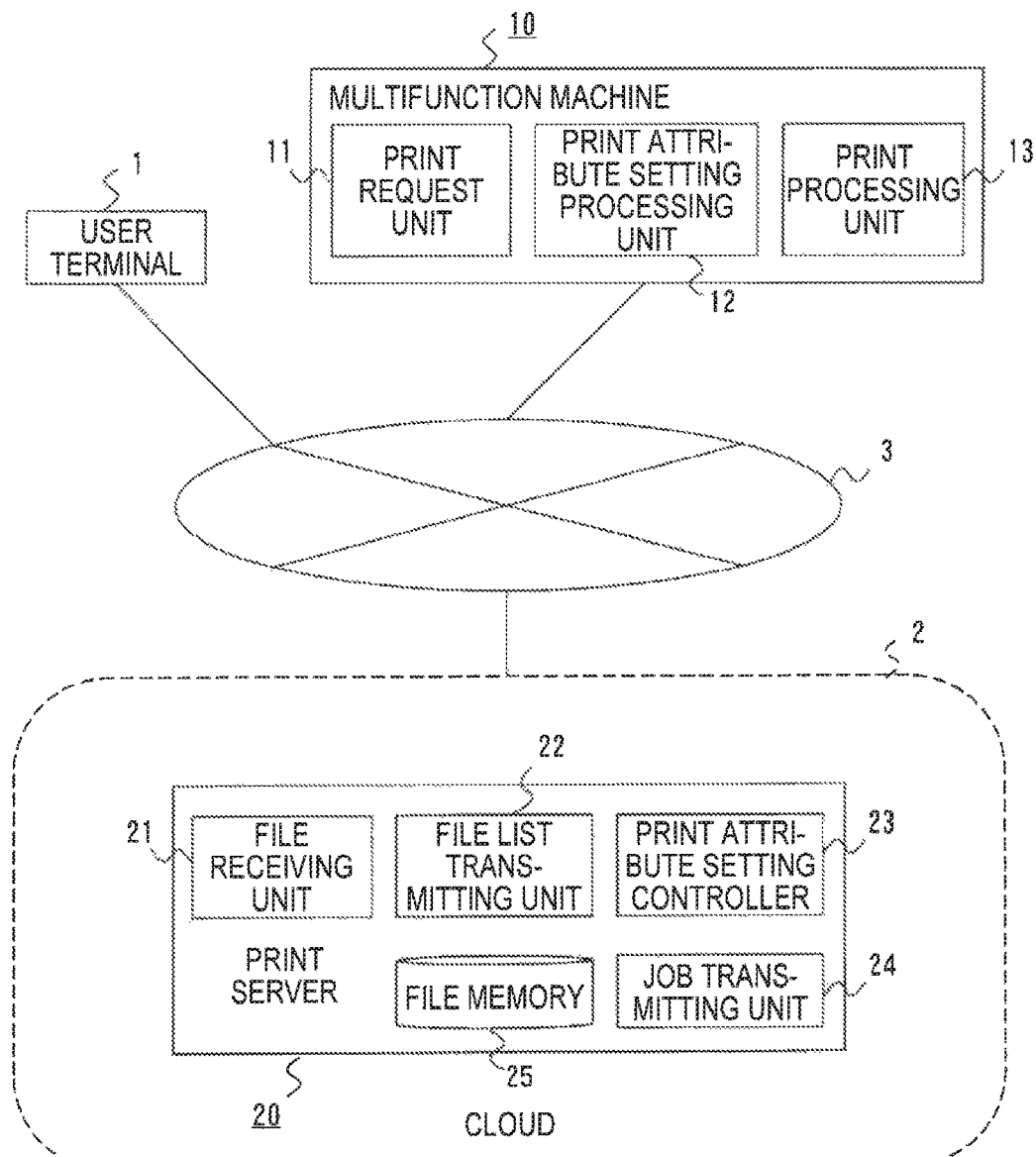
FIG. 1 is a diagram illustrating the overall configuration and a block configuration of a printing service system according to an exemplary embodiment.

FIG. 1 is a diagram illustrating the overall configuration and a block configuration of a printing service system according to an exemplary embodiment. FIG. 1 illustrates a configuration in which a user terminal 1, a multifunction machine 10, and a cloud 2 are interconnected to each other by a network 3. In reality, plural user terminals 1 and plural multifunction machines 10 having the equivalent functions are connected to the network 3. However, for the sake of convenience, one user terminal 1 and one multifunction machine 10 are illustrated in FIG. 1. The cloud 2 provides a printing service to the user, and the user terminal 1 is used by the user using the printing service. The user terminal 1 is implemented by a general-purpose information processing apparatus such as a personal computer (PC). The multifunction machine 10 is one form of an image forming apparatus that has at least a printing function to operate as a printer. In the present exemplary embodiment, the multifunction machine 10 is used as a printing device (printer). A print server 20 included in the cloud 2 is provided as a printing service providing apparatus and provides a printing service to the user.

Figure 2:
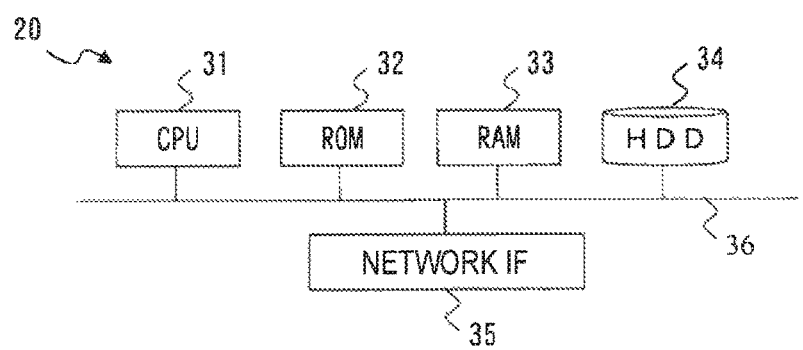
FIG. 2 is a hardware configuration diagram of a server computer forming a print server according to the exemplary embodiment.

FIG. 2 is a hardware configuration diagram of a server computer forming the print server 20 according to the present exemplary embodiment. In the present exemplary embodiment, a server computer forming the print server 20 may be implemented with a general-purpose hardware configuration. That is, as illustrated in FIG. 2, the print server 20 includes a CPU 31, a ROM 32, a RAM 33, a hard disk drive (HDD) 34, and a network interface (IF) 35 provided as a communication unit, which are interconnected via an internal bus 36.

Figure 3:
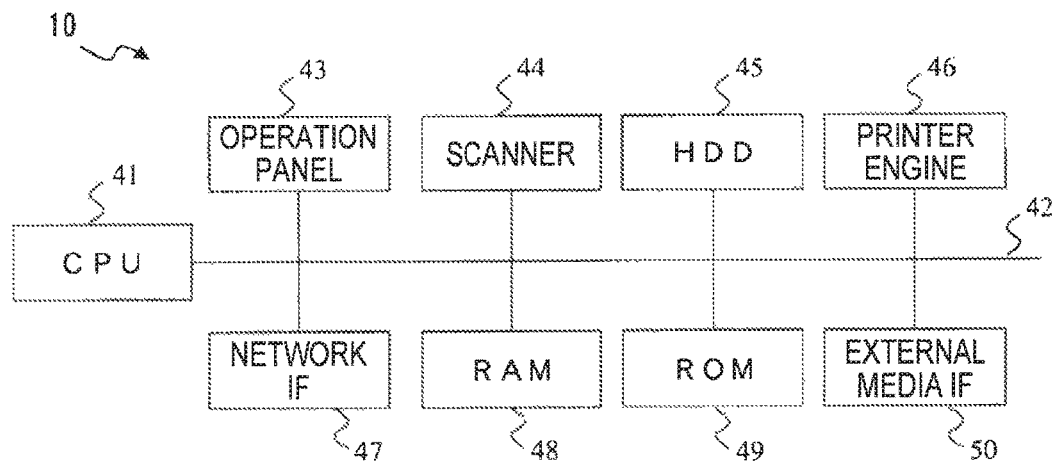
FIG. 3 is a hardware configuration diagram of a multifunction machine according to the exemplary embodiment.

FIG. 3 is a hardware configuration diagram of the multifunction machine 10 according to the present exemplary embodiment. The multifunction machine 10 is an image forming apparatus equipped with various functions such as a copying function and a scanner function, in addition to the above-described printing function, and is an apparatus incorporating a computer. The multifunction machine 10 includes a CPU 41, a ROM 49, a RAM 48, an HDD 45, and a network interface (IF) 47 provided as a communication unit, which are interconnected via an address data bus 42. The multifunction machine 10 further includes an operation panel 43 for receiving an instruction from a user and displaying information, a scanner 44 for reading an original document set by the user, a printer engine 46 for printing an image on output paper according to an instruction from a control program executed by the CPU 41, and an external media interface (IF) 50 provided with an interface with an external memory device such as, a USB memory or a flash memory, which are interconnected via the address data bus 42.

Referring back to FIG. 1, the print server 20 includes a file receiving unit 21, a file list transmitting unit 22, a print attribute setting controller 23, a job transmitting unit 24, and a file memory 25. Elements which are not used in the description of this exemplary embodiment are not illustrated in the figure. The file receiving unit 21 receives a file as a print target sent from the user terminal 1 and registers the file in the file memory 25. The file list transmitting unit 22 transmits a list of files (file list) transmitted by the user who issued a print request, and registered in the file memory 25. The print attribute setting controller 23 transmits a setting screen application to set a print attribute in the multifunction machine 10 and controls setting of the print attribute by the setting screen application. The job transmitting unit 24 generates a print job based on the print attribute information set in the multifunction machine 10 and the print target file, and transmits the generated print job to the multifunction machine 10. The term "file" used herein refers to a data file including print data to be printed.

Each of the elements 21 to 24 in the print server 20 is implemented by cooperation between a computer forming the print server 20 and a program executed on the CPU 31 included in the computer. Further, the file memory 25 is implemented with the HDD 34 included in the print server 20. Alternatively, another memory such as the RAM 33 or a database server constituting the cloud 2 may be used via a network.

The multifunction machine 10 includes a print request unit 11, a print attribute setting processing unit 12 and a print processing unit 13. Elements which are not used in the description of this exemplary embodiment are not illustrated in the figure. The print request unit 11 requests the print server 20 to print a file that is previously uploaded. The print attribute setting processing unit 12 performs a print attribute setting process for printing the print target file. The print processing unit 13 executes a printing process based on the print job transmitted from the print server 20.

Each of the elements 11 to 13 in the multifunction machine 10 is implemented by cooperation between a computer incorporated in the multifunction machine 10 and a program executed on the CPU 41 included in the computer.

In addition, a program used in the present exemplary embodiment may be provided not only through a communication unit but also may be provided in the form of a computer-readable recording medium such as a CD-ROM or a USB memory. The program provided through the communication unit or from the recording medium is installed in a computer and various processes are implemented by a CPU of the computer sequentially executing the programs.

Next, an operation in the printing service system according to the present exemplary embodiment will be described.

Before using the printing service provided by the print server 20, the user uploads and registers a file to be printed from the user terminal 1 to the print server 20 in advance. As described above, upon receiving the file sent from the user terminal 1, the file receiving unit 21 in the print server 20 stores the file in the file memory 25.

Figure 4:
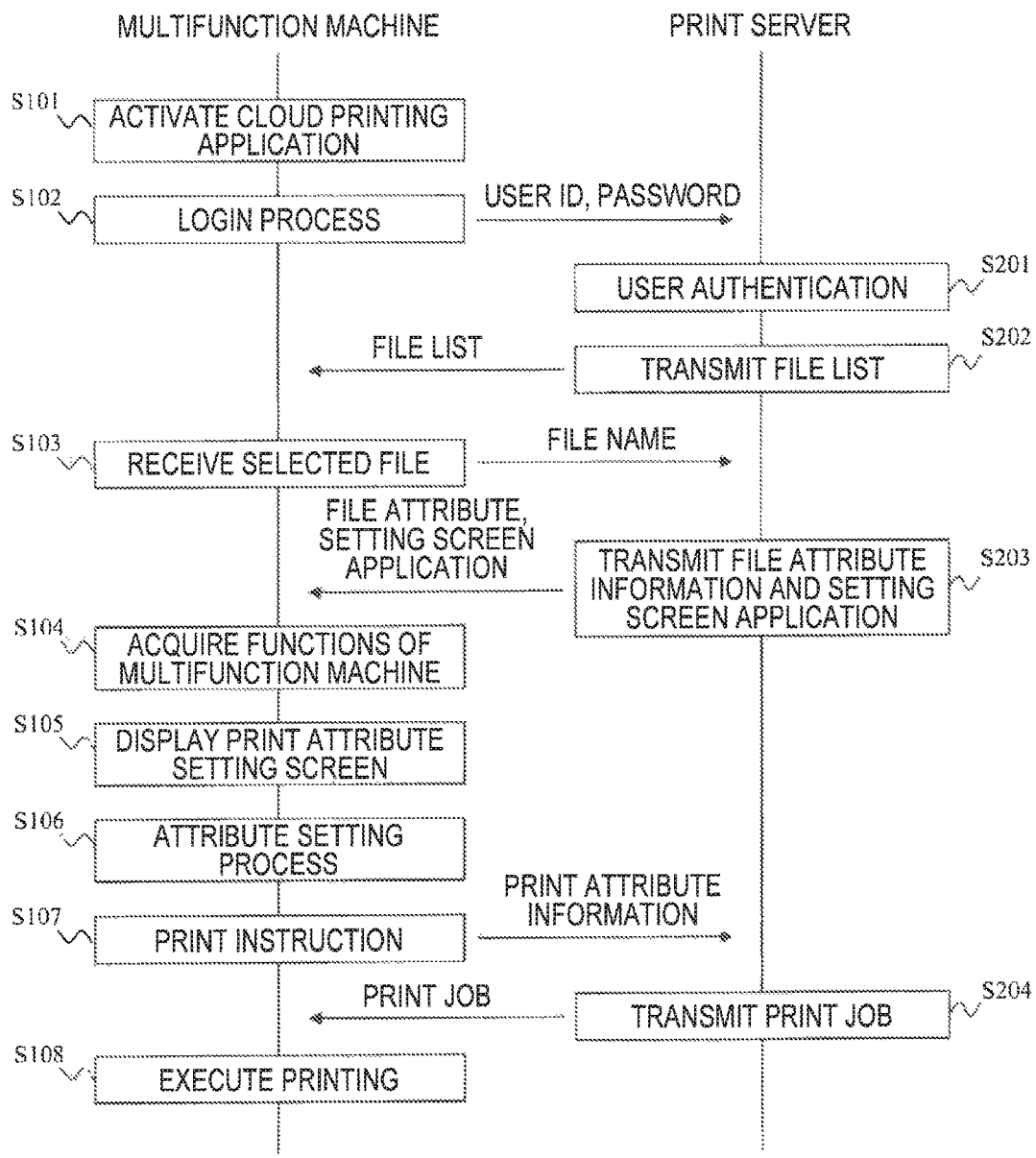
FIG. 4 is a sequence diagram illustrating a process from the time when a user operates the multifunction machine to the time when printing is executed, according to the exemplary embodiment.

After the pre-registration of the file, the user moves to a place where the multifunction machine 10 to be used for printing is installed. Hereinafter, a process from when the user operates the multifunction machine 10 to when the printing is executed will be described with reference to a sequence diagram illustrated in FIG. 4.

The user performs a predetermined instruction operation from the operation panel 43 in order to execute printing using a printing service. In response to this operation, a cloud printing application is activated (step S101). The print request unit 11, which starts its operation when the cloud printing application is activated, executes a login process by requesting the user to input login information (step S102). When the user inputs a user ID and a password from a login screen displayed on the operation panel 43, the print request unit 11 requests the use of the printing service by transmitting the input user ID and password to the print server 20.

The print server 20 performs user authentication based on the transmitted login information (step S201), but it is here assumed that the user authentication is successful. The file list transmitting unit 22 searches the file memory 25 based on the user ID of the authenticated user to generate a file list (file name list) of the user and transmits the file list to the multifunction machine 10 (step S202).

Upon receiving the file list, the print request unit 11 of the multifunction machine 10 displays the file list on the operation panel 43. When the user selects a file to be printed from the file list, the print request unit 11 receives the file, and transmits, for example, a file name of the selected file, as identification information of the selected file, to the print server 20 (step S103).

When the file name is sent from the multifunction machine 10, the print attribute setting controller 23 of the print server 20 extracts the attribute information of the file stored in the file memory 25. The attribute information of the file to be extracted is information required to set the printing attribute and is, for example, the number of pages of a file, paper size, and the like. Upon extracting a setting screen application from a memory (not illustrated), the print attribute setting controller 23 transmits the file attribute information and the setting screen application to the multifunction machine 10 (step S203).

Upon receiving the file attribute information and the setting screen application, the multifunction machine 10 activates the setting screen application. The print attribute setting processing unit 12 starting its operation upon the activation of the setting screen application first acquires the capability of the multifunction machine 10, that is, all the functions provided by the multifunction machine 10 (step S104). The acquired functions include the basic functions commonly provided by the multifunction machine 10 compatible with the printing service and application functions which are other than the basic functions and which are provided by the multifunction machine 10. Then, the print attribute setting processing unit 12 generates a print attribute setting screen enabling selection of functions provided by the multifunction machine 10, and displays the generated print attribute setting screen on the operation panel 43 (step S105).

FIGS. 5 and 6 are views illustrating examples of a setting screen displayed by the setting screen application. The user sets a print attribute of a file from the setting screen. The "print attribute" used herein is an attribute (job attribute) of a function to be used for printing, such as color mode and enlargement/reduction, and an attribute value to be set for the job attribute. The print attribute includes (i) attributes of the basic functions such as the color mode and the paper size and (ii) attributes of application functions including at least one of an imposition processing function (corresponding to "collectively one sheet (N up)" in FIG. 5), a booklet making function (corresponding to "bookbinding" in FIG. 6) and a stapling function and a punching function.

The printing service provided by the cloud 2 has provided a setting screen for making use of the basic functions commonly provided to the multifunction machine 10 compatible with the printing service. In the present exemplary embodiment, however, a function provided by the multifunction machine 10 is acquired when a print request is made and executed, and a setting screen enabling selection of the acquired function is generated and displayed each time. That is, in addition to the basic functions of the related art, a setting screen enabling selection of application functions other than the basic functions is generated and displayed on the operation panel 43. In addition, the selectable application functions need not be all functions other than the basic functions.

The print attribute setting processing unit 12 executes the attribute setting process for causing the user to set a desired print attribute from the setting screen illustrated in FIGS. 5 and 6 by the setting screen application (step S106), but it may not be said that the user always correctly sets the print attribute. Therefore, in the present exemplary embodiment, the validity of the setting of the print attribute is checked. Hereinafter, a process concerning a prohibition check, that is, determination on the validity of the setting of the print attribute, in the print attribute setting process in step S106, will be described with reference to the flow chart illustrated in FIG. 7.

For example, depending on the size and orientation of paper, duplex printing may not be performed or stapling or punching may not be performed. Therefore, it is checked whether or not an inappropriate print attribute is set for the size and orientation of paper. When the inappropriate print attribute is set (Y in step S1061), starting printing with the setting as it is would cause a problem during execution of printing. Thus, the print attribute setting processing unit 12 cancels the setting of the print attribute (step S1062). In other words, the contents of the setting are to be invalid so as not to be accepted. In this case, it is suitable to indicate a message of the cancellation and the reason thereof in a message field 4 of the setting screen displayed on the operation panel 43. By referring to the message and knowing that the set print attribute is not a, the user sets a print attribute so as to become a valid combination.

In addition, for either of the number of an original document is one or two with duplex printing being selected, binding is not be performed even if stapling is set. In this way, when an inappropriate print attribute is set from the number of printed sheets or a relationship between the number of printed sheets and other print attribute setting (Y in step S1063), starting the printing with the setting as it is would cause a problem during execution of printing. Thus, the print attribute setting processing unit 12 cancels the setting of the print attribute (step S1064). In other words, the contents of the setting are to be invalid so as not to be accepted. In this case, it is suitable to indicate a message of the cancellation and the reason thereof in a message field 4 of the setting screen displayed on the operation panel 43.

There may be a case where post-processing to be executed after printing is included as a settable printing attribute. In this case, however, for example, booklet making and punching cannot be used in combination. When the post-processing attributes which cannot be used in combination are set in this manner (Y in step S1065), starting the printing with the setting as it is would cause a problem during execution of printing. Thus, the print attribute setting processing unit 12 accepts only one print attribute according to a predetermined priority and cancels the other printing attributes (step S1066). The predetermined priority may be set in advance in each multifunction machine 10. It is desirable to indicate accepted post-processing and not-accepted received processing in the message field 4.

When the post-processing is executed, trays to which paper can be discharged are limited for mechanical reasons. Accordingly, when a discharge destination to which paper cannot be discharged is set (N in step S1067), starting the printing with the setting as it is would cause a problem during execution of printing. Thus, the print attribute setting processing unit 12 is automatically changed to a dischargeable destination (step S1068). It is desirable to display the discharge destination before and after the change in the message field 4.

As described above, even when a settable print attribute cannot be set because of the relationship with other print attributes, it is possible to prevent the occurrence of a problem in advance by canceling the set print attribute.

Figure 7:
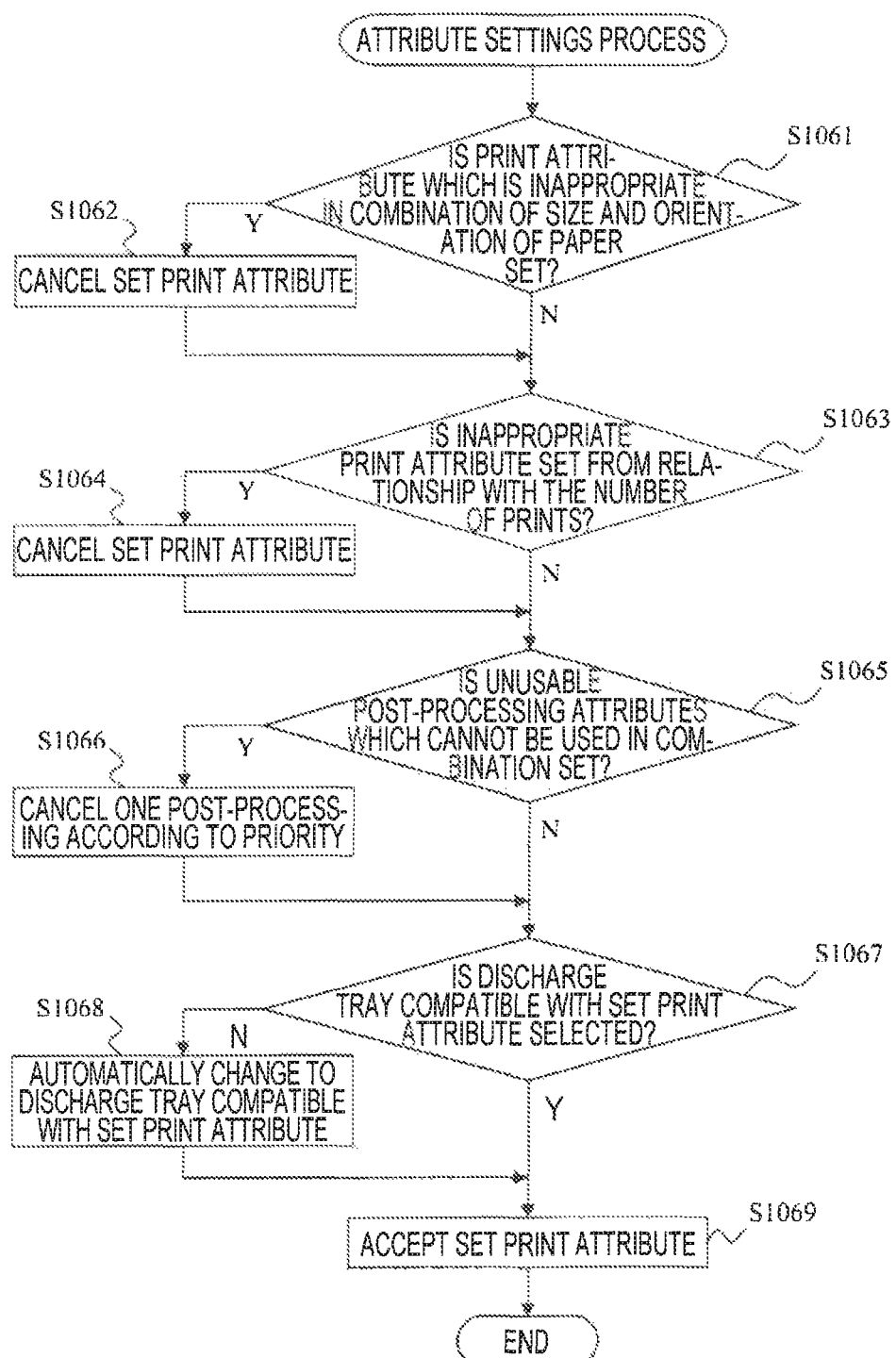
FIG. 7 is a flowchart illustrating a process related to determination of correctness of setting of print attributes in the present exemplary embodiment.

Although FIG. 7 illustrates an example of four inappropriate print attributes or a combination thereof, the present invention is not limited to this example and may include other types of prohibition checks depending on the functions provided by the multifunction machines 10. In addition, the order of the determining steps is not limited thereto.

When the user selects a print button 5 after determining the validity of the setting of the print attribute as described above, the print attribute setting processing unit 12 issues a print instruction by transmitting the print attribute information including the print attribute and the file attribute set from the setting screen to the print server 20 (step S107).

Upon receiving the print attribute information, the job transmitting unit 24 in the print server 20 takes out the corresponding file from the file memory 25, generates a print job including the print attribute information, and transmits the generated print job to the multifunction machine 10 (step S204).

Upon receiving the print job, the print processing unit 13 in the multifunction machine 10 executes printing according to the setting contents of the print job (step S108).

According to the present exemplary embodiment, even in a case of using the printing service provided by the cloud 2, it is possible to execute printing using all the functions provided by the multifunction machine 10, including application functions without being limited to the basic functions. In the present exemplary embodiment, the setting screen application is transmitted to and executed by the multifunction machine 10 so that the printing using the application functions may be executed. In particular, in the present exemplary embodiment, since the setting screen application is transmitted from the print server 20 (the cloud 2) to the multifunction machine 10 in response to a print request from the user, the latest setting screen application may be always used by the multifunction machine 10.

In the present exemplary embodiment, the setting screen application is transmitted from the print server 20 (the cloud 2) to the multifunction machine 10 to generate a setting screen specialized for the multifunction machine 10 on the side of the multifunction machine 10. However, a function provided by the multifunction machine 10 may be notified to the print server 20 to generate a setting screen on the side of the print server 20.

Further, in the present exemplary embodiment, the setting screen application is used to perform the print attribute setting process including the prohibition check exemplified in FIG. 7 on the side of the multifunction machine 10. However, the contents of the setting from the operation panel 43 may be transmitted to the print server 20, and the print server 20 side may determine whether or not the setting is appropriate. Further, the setting screen generated on the side of the print server 20 may be displayed and operated on the user terminal 1.

Further, in the present exemplary embodiment, the print server 20 generates a print job. However, a print target file may be transmitted to the multifunction machine 10 to complete the print job on the side of the multifunction machine 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing service providing apparatus comprising:
   a display controller that performs control to display a setting screen on a printing device that a user uses for printing, the setting screen enabling the user to select (i) a basic function that is commonly provided to printing devices compatible with a printing service that uses cloud computing and (ii) an application function which is other than the basic function and which is provided by the printing device that the user uses for printing among the printing devices compatible with the printing service which uses the cloud computing; and
   a transmitting unit that transmits a print target file to the printing device that the user uses for printing, when a print attribute indicating contents of a print instruction is set from the setting screen.

2. The printing service providing apparatus according to claim 1, wherein the printing attribute set from the setting screen includes at least contents of setting related to the selected application function.

3. The printing service providing apparatus according to claim 1, wherein the display controller transmits a setting screen application along with attribute information of a file selected as a print target by the user according to a request from the user, to the printing device that the user uses for printing, and causes the printing device to execute the setting screen application to generate the setting screen.

4. The printing service providing apparatus according to claim 3, wherein when the setting screen application is activated on the printing device that the user uses for printing, the setting screen application acquires a function provided by the printing device and displays on the printing device the setting screen that enables the user to select the acquired function.

5. The printing service providing apparatus according to claim 1, wherein printing attribute information including the printing attribute set from the setting screen is transmitted to the printing device.

6. The printing service providing apparatus according to claim 1, wherein when following the print attribute set on the setting screen will cause a problem during execution of printing, the print attribute is not accepted.

7. The printing service providing apparatus according to claim 1, wherein when a problem will occur during execution of printing because print attributes which cannot be used in combination are set from the setting screen, one of the print attributes which cannot be used in combination is accepted according to a predetermined priority.

8. The printing service providing apparatus according to claim 1, wherein the application function is at least one of an imposition processing function, a booklet making function, a stapling function and a punching function.

9. A printing service system comprising:
   a printing service providing apparatus that provides a printing service which uses clouding computing; and
   a plurality of printing devices compatible with the printing service, wherein
   the printing service providing apparatus includes
      a display controller that performs control to display a setting screen on a printing device that a user uses for printing, the setting screen enabling the user to select (i) a basic function that is commonly provided to printing devices compatible with the printing service that uses the cloud computing and (ii) an application function which is other than the basic function and which is provided by the printing device that the user uses for printing among the printing devices compatible with the printing service which uses the cloud computing, and
      a transmitting unit that transmits a print target file to the printing device that the user uses for printing, when a print attribute indicating contents of a print instruction is set from the setting screen, and
   each of the printing devices includes
      a setting processing unit that displays the setting screen and sets the print attribute indicating contents of a print instruction, and
      a printing processing unit that executes a printing process of a file transmitted from the printing service providing apparatus in accordance with contents of the setting of the print attribute.

10. A non-transitory computer readable storage medium storing a program that, when executed, causes a computer to:
   display a setting screen on a printing device that a user uses for printing, the setting screen enabling the user to select (i) a basic function that is commonly provided to printing devices compatible with a printing service that uses cloud computing and (ii) an application function which is other than the basic function and which is provided by the printing device that the user uses for printing among the printing devices compatible with the printing service which uses the cloud computing; and
   transit a print target file to the printing device that the user uses for printing, when a print attribute indicating contents of a print instruction is set from the setting screen.

* * * * *